Figure 5:
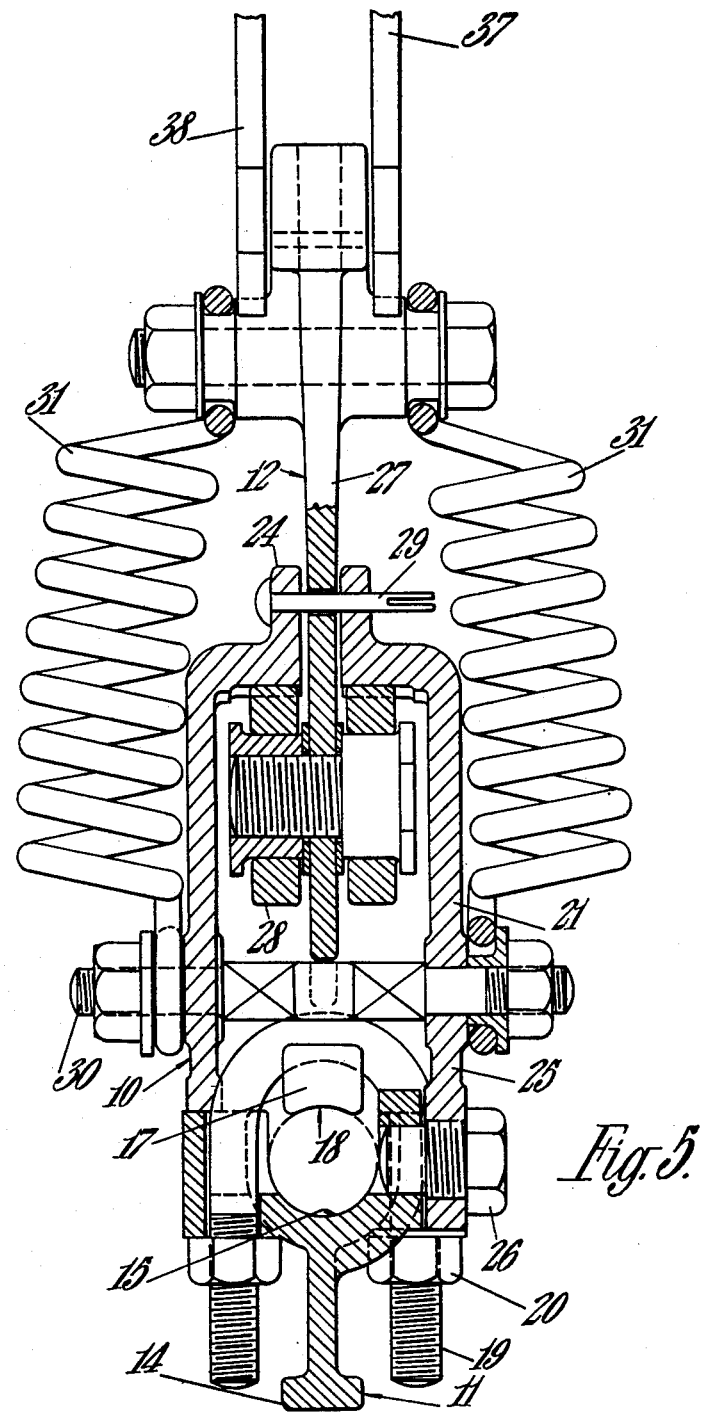

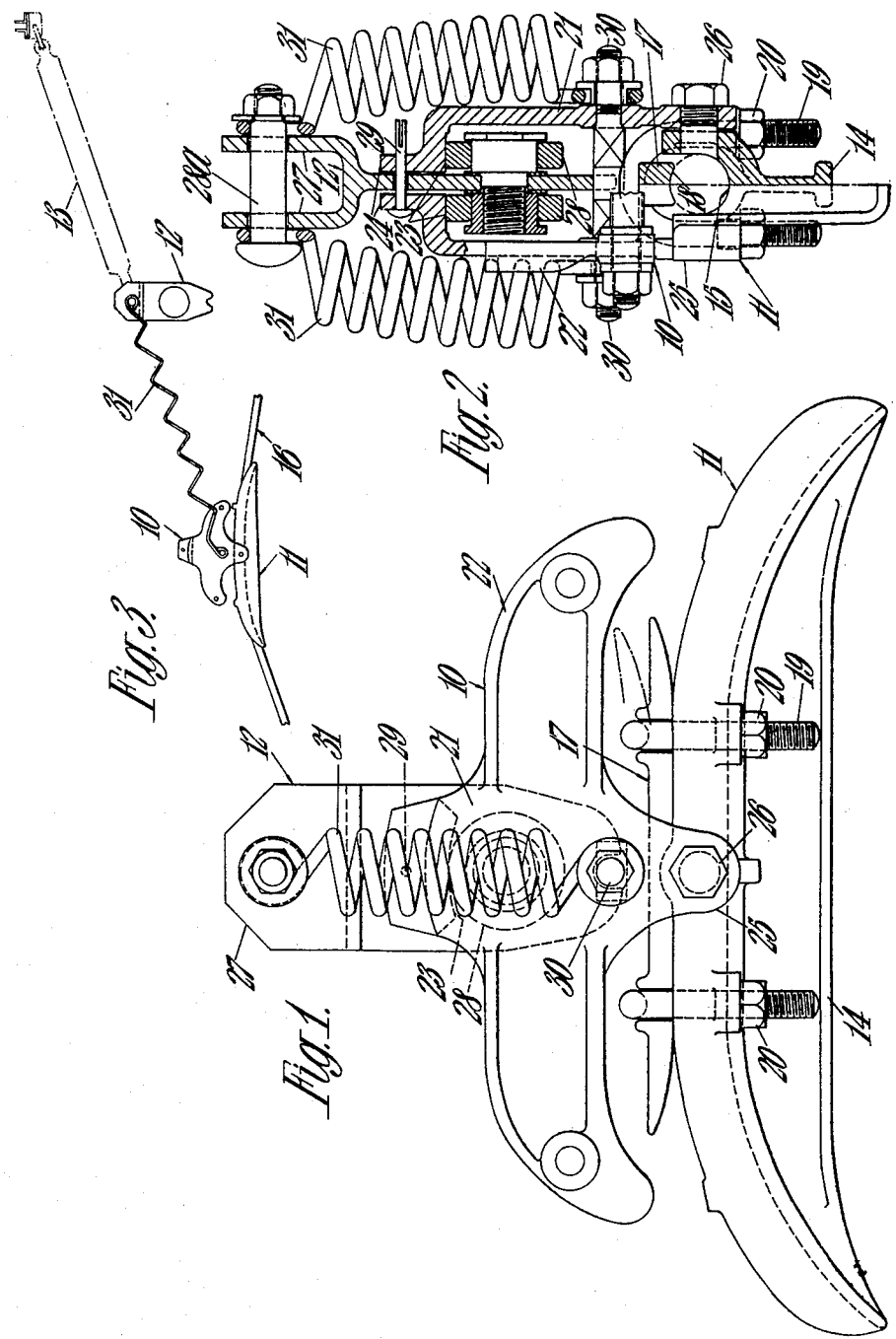

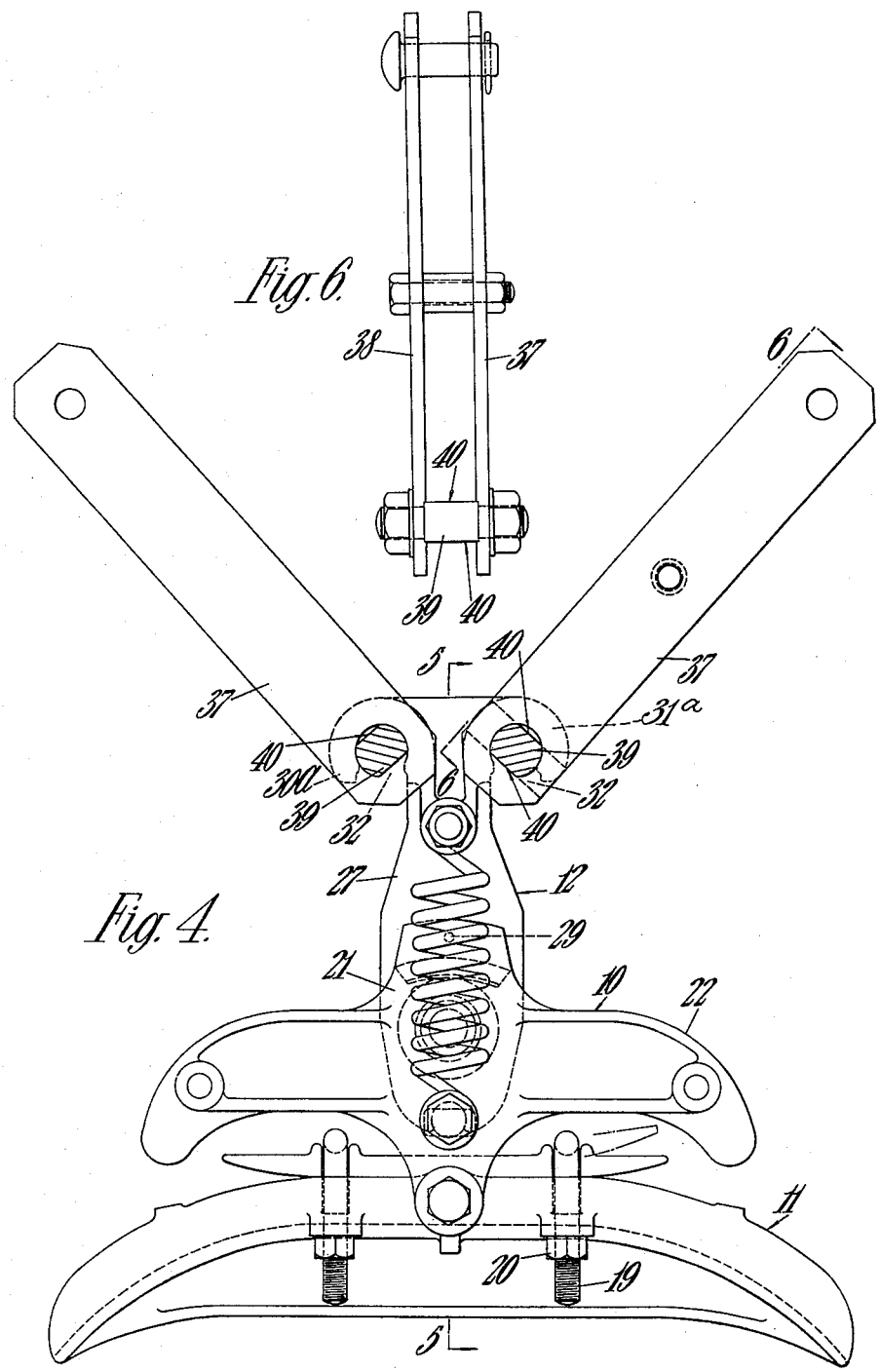

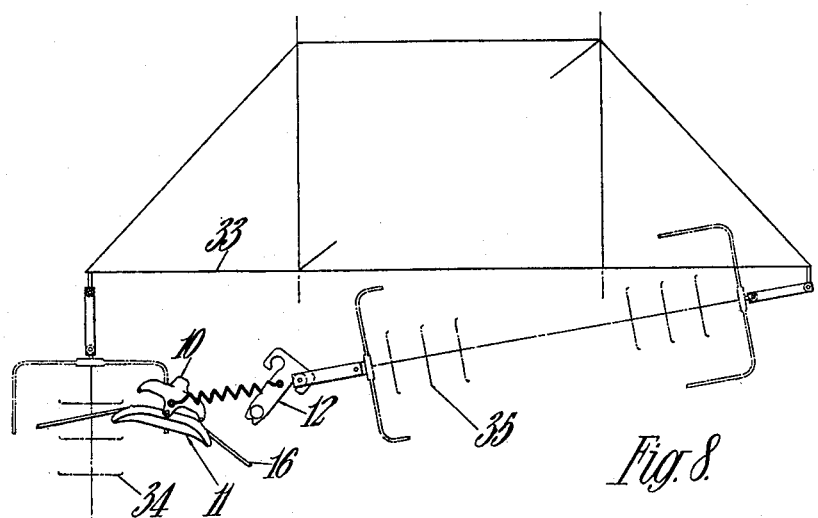
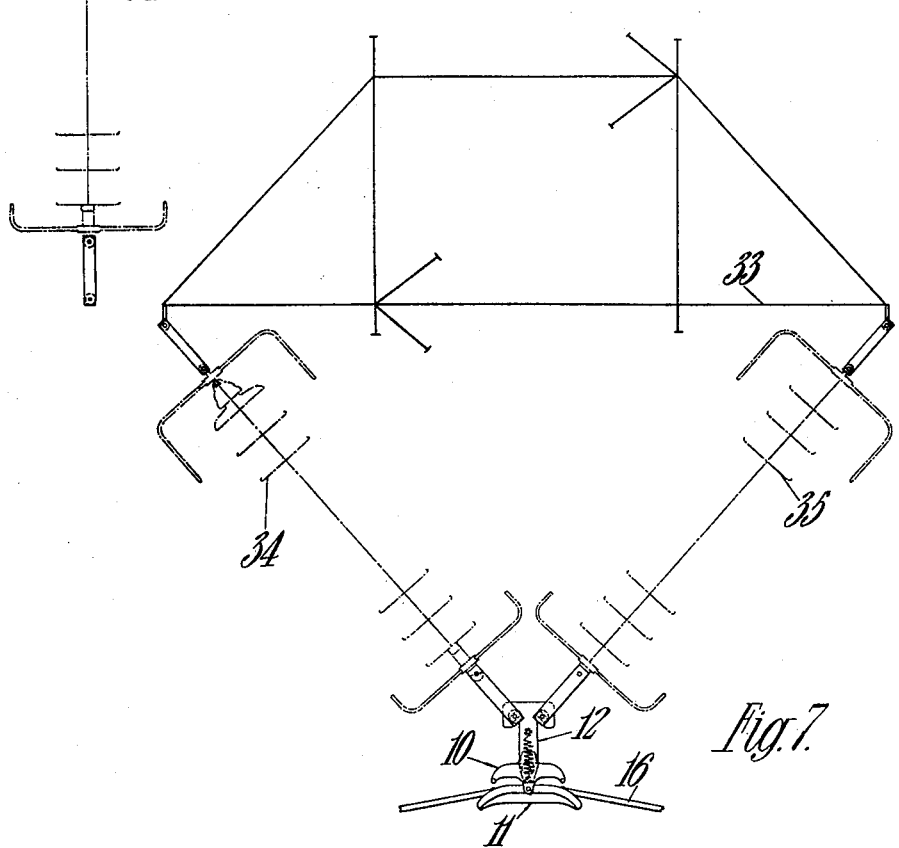

United States Patent Office 3,005,866
Patented Oct. 24, 1961

3,005,866
MEANS FOR CONNECTING OVERHEAD HIGH TENSION ELECTRICAL CABLES TO THE INSULATORS OF TRANSMISSION TOWERS
Hugh Fraser and William Gordon Cantlay, both of 3 Blairbeth Terrace, Burnside, by Rutherglen, Scotland
Filed Jan. 6, 1960, Ser. No. 774
Claims priority, application Great Britain Apr. 27, 1959
4 Claims. (Cl. 174—45)

This invention has reference to means for connecting overhead high tension electrical cables to the suspension insulators of overhead transmission towers.

In the suspension means at present in use for connecting high tension electrical cables to the insulators of overhead transmission towers serious damage is liable to occur in the event of a cable breaking between two transmission towers. The force suddenly applied by the cable on the other side of the towers, i.e. the unbroken cable, is apt to damage the insulator and to set up severe stresses on the tower structure.

In our U.S. Patent No. 2,931,606 is set forth a suspension unit for connecting high tension electric cables to the insulators of transmission towers such means comprising an upper part adapted for pivotal connection to an insulator and a lower part having clamping means by which a cable can be connected thereto, the two parts being detachably connected in such manner that in the event of the cable on one side of the lower part breaking such part becomes detached and falls to the ground.

According to the present invention a suspension unit for connecting high tension electric cables to the insulators of a transmission tower comprises an upper part for pivotal connection to the insulator, a lower part to which the cable can be clamped, the lower part being so supported by the upper part that in the event of the cable on one side of the unit breaking the lower part becomes detached from the upper part, and one or more coils of ductile metal interconnecting the lower part to the upper part and which in the event of the lower part becoming detached extends (or extend) to permit the cable secured to the lower part to drop to a limited extent and thereby prevent sudden shock being imparted to the tower and any danger which might arise if the cable dropped to the ground.

The invention further consists in a suspension unit as set forth in the preceding paragraph wherein the lower part is provided with lateral extensions and pivotally supported clamping means which includes a cradle for the reception of the cable, the cradle having a limited rocking movement limited by the said lateral extensions.

Circumstances may arise wherein, when a cable breaks, the additional sag of the unbroken cable on one side of the clamping device may be undesirable or dangerous and our present invention further consists in suspending the improved suspension unit from two insulators which extend upwardly and outwardly from each other in the plane of the cable, the connections to the suspension unit being such that on the breaking of a cable the unit turns to release one of the insulators while the other insulator swings to conform with the sag in the unbroken side of the cable, such movement being substantially smaller than that which would occur if the said insulator was normally vertical so that the additional sag in the unbroken cable is reduced.

In such development of the invention the upper part of the suspension unit may be provided with laterally disposed lugs with eye holes with gaps on their under sides and the unit connected to the insulators by means of links having studs provided with flats which studs are normally retained in the eye holes, the construction being such that when a cable breaks and the lower part of the unit is released the unit swings to a tilted position whereon the flats of one of the studs register with the gap in its eye, such stud then dropping free to release one of the links and its insulator while the other insulator and its link then conform to the sag of the unbroken cable.

The sag may be such that the next suspension unit turns to such extent that one of its insulators is released whereon the other insulator assumes a position in accordance with the pull of the cable on the side remote from the break.

Further units may in like manner be released from one of their insulators.

Preferred embodiments of the invention will now be described with reference to the accompanying drawings wherein:

FIGURE 1 is an elevation of a suspension unit in accordance with the present invention;
FIGURE 2 is an end view thereof partly in section;
FIGURE 3 shows the unit connected to an insulator with the lower part thereof detached from the upper part and the coils of ductile metal interconnecting the two parts distended;
FIGURE 4 is an elevation of a modified form of suspension unit with links for connection to two insulators;
FIGURE 5 is a section on the line 5—5 of FIGURE 4;
FIGURE 6 is a plan view of one of the links shown in FIGURE 4 looking in the direction of the arrows;
FIGURE 7 shows diagrammatically the unit, links and insulators suspended from a tower; and
FIGURE 8 is a view corresponding to FIGURE 7 but showing the position of the suspension unit, links and insulators when the cable breaks.

The improved suspension unit as shown in FIGURES 1 to 3 of the drawings is formed of a lower part 10 which supports cable clamping means 11 and the upper part 12 which is secured to or is adapted to be secured to the lower end of an insulator 13 and supports the part 10.

The cable clamping means 11 consists of a cradle 14 having a substantially semi-circular bed 15 adapted to snugly receive a cable 16. The cradle sweeps downwards at its two ends. Cooperating with the cradle cable is a clamping member or tongue 17 with semi-circular face 18. U-shaped clamping bolts 19 straddle the clamping member and pass through bolt holes in the cradle, nuts 20 being screwed on the bolts to draw the clamping member towards the cradle and thereby clamp the cable tightly between the clamping member and the cradle.

The part 10 consists of two opposed side members 21 each having two laterally extending arms 22, a centrally positioned roller tract 23 and above each track an upwardly extending lug 24. Each side member is provided with a centrally positioned downwardly extending lug 25 which, by means of studs 26, pivotally supports the cradle.

The upper part 12 at its upper end is bifurcated to form two opposed lugs 27 through which extends a bolt 28a by which the suspension unit is connected to the lower end of the insulator 13, see FIGURE 3, the insulator being supported by a transmission tower. Below its bifurcated end the upper member extends downwardly between the members 21 and supports a pair of rollers 28 on which bear the aforesaid roller tracks 23.

A shear pin 29 passes through aligned holes in the lugs 24 and the part of the upper member positioned therebetween.

Extending through aligned holes in the side members 21 and a bight in the foot of the upper member is a bolt 30. Anchored to the bolt 28a are the upper ends of two coils 31 of annealed mild steel and the lower ends of said coils are anchored to the bolt 30.

In the event of the cable 16 on either side of the suspension unit snapping the cradle 14 under the pull of the unbroken cable will be caused to turn about the studs 26 and will abut against the corresponding laterally extending arm 22 causing the unit to swing about the bolt 28a. This results in the shear pin 29 being sheared and the tracks 23 running off the rollers 28.

The track carrying member together with the cradle and clamping member will then drop to relieve the tower of sudden shock but do not drop to the ground. The two coils 31, being of annealed mild steel, stretch out as indicated in FIGURE 3. In a coil six inches long and one-and-a-quarter inches in mean diameter the extension may amount to about eighteen inches. Such extension is sufficient to prevent any sudden shock being imparted to the tower on a cable breaking.

It is to be noted that the coils are not of spring steel which would permit only a very limited drop, say an inch or two, and this would not serve to relieve the tower of shock due to a cable on one side thereof snapping.

In lieu of the rollers supporting the tracks the suspension unit may be designed so that the tracks support the rollers, the rollers rolling off the tracks when a shear pin is sheared due to a cable breaking.

The construction of the suspension unit shown in FIGURES 4 and 5 is substantially similar to that already described, the reference numerals thereon corresponding to those in FIGURES 1 and 2. It however differs from the prior construction in that the upper part thereof is provided with lateral lugs 30a and 31a each having an eyehole provided with a downwardly facing gap 32. Such unit is suspended from an arm 33 of a pylon tower, see FIGURES 7 and 8, by means of two suspension insulators 34 and 35 connected one towards each outer end of the arm. To the lower end of each insulator is connected a link formed of two parallel elongated plates 37 and 38, which at their lower ends are interconnected by means of a stud 39 having flats 40, the distance between the flats being slightly less than the gap in the eye holes. Normally the suspension unit is suspended by the two insulators and their links, the studs engaging the eye holes and being in such position that the flats cannot pass through the gaps. As shown in FIGURE 7 the two insulators and their links then form two sides of a triangle, the suspension unit being positioned at their intersection.

In the event of a cable snapping the shear pin gives and the lower part of the unit together with the cable drop thereby extending the two coils as above described. But when the unit turns under the action of the pull of the unbroken cable the gap 32 in the eye hole of the lug which moves upwards is brought into register with the flats in the stud which is fitted in said eye hole. The stud then drops through the gap and thus permits the said link and insulator to drop to a vertical position while the other link and insulator assumes a position in accordance with the sag in the cable. This is shown in FIGURE 8. It will be noted, however, that the additional sag of the cables due to the new position of the insulator and link is small compared with what would be the case if a single suspension insulator was employed.

The two insulators should be off-set with respect to each other so that when one drops to a vertical position and the other swings into its new position the two will not foul each other.

It will be seen that the unbroken cable now sags to a greater extent than formerly and this may be sufficient to cause the next suspension unit to turn sufficiently to release one of its links and insulator so that it likewise assumes a position depending on the pull of the cable thereon. Thus the shock due to a broken cable is thereby spread over two pylons. Should further suspension units in turn act in like manner the shock can be spread over a further pylon or pylons.

It will be understood that if a cable breaks the suspension unit adjacent to the break, in addition to operating to release one of the insulators, will in turn break the shear pin whereon the lower part of the unit, complete with the clamping means thereof, will drop clear of the upper part and that the ductile coils will then become elongated, as above described.

What we claim is:

1. A suspension unit for suspending an overhead high tension cable from an insulator pivotally suspended from a tower comprising an upper part for pivotal connection to the insulator, a lower part having clamping means by which a cable can be secured thereto, one of said parts having at least one roller and the other part having a track on which the roller bears whereby the lower part is supported by the upper part when said parts are in their assembled positions, a shear pin extending through both parts whereby the two parts are normally retained in their assembled positions, said shear pin being such that it shears when the unit pivots about its pivotal support to a predetermined extent, as will occur when the cable on one side of the clamping device breaks, and thus permits the lower part together with the clamping means to move relative to the upper part so that the roller clears its track whereon the lower part together with the clamping means is permitted to drop, and at least one coil of ductile metal connecting the lower part to the upper part, which coil when the lower part drops extends and thereby restricts the drop, the insulator and extended coil then forming a continuation of the unbroken cable and reducing the shock on the tower supporting the unbroken cable.

2. A suspension unit as claimed in claim 1 wherein the lower part is provided with lateral extensions extending in the line of the cable and which part supports clamping means which includes a cradle for the reception of a cable, the cradle being mounted to partake of a rocking movement about a transverse axis which movement is limited by said extensions.

3. Means for suspending a high tension electrical cable from a tower comprising an upper part, a pair of links detachably connecting said part to the lower ends of a pair of insulators pivotally supported by the tower, said links and insulators forming two sides of a triangle, a lower part having clamping means by which a cable can be secured thereto, one of said parts having at least one roller and the other part having a track on which the roller bears whereby the lower part is supported by the upper part when said parts are in their assembled positions, a shear pin extending through both parts whereby the two parts are normally retained in their assembled positions, said shear pin being such that it shears when the unit pivots about its pivotal support to a predetermined extent, as will occur when the cable on one side of the clamping device breaks, and thus permits the lower part together with the clamping means to move relative to the upper part so that the roller clears its track whereon the lower part together with the clamping means is permitted to drop, and at least one coil of ductile metal connecting the lower part to the upper part, which coil when the lower part drops extends and thereby restricts the drop, one of the insulators, one of the links and extended coil then forming a continuation of the unbroken cable and reducing the shock on the tower while the other link becomes detached from the unit.

4. Means for suspending a high tension electric cable from a tower as claimed in claim 3 wherein the upper part is provided with an upward extension having laterally extending lugs, said lugs having eye-holes with gaps and wherein the two links have studs which fit into the eye-holes and thereby support the unit, said studs having flats which, when the unit pivots on the breaking of the cable, permits one of the studs to slip through the gap whereon the other link, its extended coil and insulator take up a position to form a continuation of the unbroken cable.

References Cited in the file of this patent

UNITED STATES PATENTS

| | | |
|---|---|---|
| 1,616,931 | Thomas | Feb. 8, 1927 |
| 2,026,978 | Jester | Jan. 7, 1936 |
| 2,665,128 | Guffey | Jan. 5, 1954 |
| 2,931,606 | Fraser et al. | Apr. 5, 1960 |

FOREIGN PATENTS

| | | |
|---|---|---|
| 423,087 | Germany | Dec. 23, 1925 |
| 172,878 | Austria | Oct. 25, 1952 |